United States Patent
Tripathi et al.

(10) Patent No.: US 10,078,642 B1
(45) Date of Patent: Sep. 18, 2018

(54) DYNAMIC MEMORY SHRINKER FOR METADATA OPTIMIZATION

(71) Applicant: HGST, Inc., San Jose, CA (US)

(72) Inventors: Shailendra Tripathi, Fremont, CA (US); Danny McGregor, Union City, CA (US)

(73) Assignee: HGST, Inc., San Jose, CA (US)

( * ) Notice: Subject to any disclaimer, the term of this patent is extended or adjusted under 35 U.S.C. 154(b) by 0 days.

(21) Appl. No.: 15/603,414

(22) Filed: May 23, 2017

(51) Int. Cl.
- *G06F 7/00* (2006.01)
- *G06F 17/00* (2006.01)
- *G06F 17/30* (2006.01)
- *G06F 12/12* (2016.01)
- *G06F 12/0891* (2016.01)

(52) U.S. Cl.
CPC .... *G06F 17/30132* (2013.01); *G06F 12/0891* (2013.01); *G06F 12/12* (2013.01); *G06F 17/30138* (2013.01); *G06F 2212/60* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 7,685,360 B1* | 3/2010 | Brunnett | G06F 3/0608 360/31 |
| 8,745,630 B2 | 6/2014 | Choi et al. | |
| 2004/0098200 A1* | 5/2004 | Wentland | G01V 1/34 702/2 |
| 2012/0042321 A1* | 2/2012 | Choi | G06F 3/0611 718/104 |
| 2013/0275656 A1* | 10/2013 | Talagala | G06F 12/0246 711/103 |
| 2014/0200147 A1* | 7/2014 | Bartha | G06F 19/10 506/2 |
| 2017/0177479 A1* | 6/2017 | Salyers | G06F 12/0802 |

* cited by examiner

*Primary Examiner* — Tuan A Pham

(57) ABSTRACT

A method for managing file system memory includes starving an initial metadata memory area of a storage pool created for a file system transaction including cache data and log data. The method also includes determining on a transactional basis a ratio of metadata memory use to cache data use and an available unused portion of cache data memory replaceable in predetermined slab increments in the cache data. The method additionally includes shrinking transactionally the cache data per the slab increments based on the ratio via cleaning the cache data slabs and attaching the cache data slabs to the metadata memory area for temporary metadata use. The method further includes replacing the cache data slabs from the metadata memory area to the cache data based on a completion of the file system transaction. The slabs vary 5% to 10% or any arbitrary percentage of metadata space to cache data space.

14 Claims, 5 Drawing Sheets

DYNAMIC MEMORY SHRINKER FOR METADATA OPTIMIZATION

BACKGROUND OF THE INVENTION

Solid-state arrays have moved the external controller-based storage array market from a relatively stagnant incrementally improving market with slow-changing dynamics to a progressive neoclassical market. Improvements in the dynamics of many factors—such as reduced storage administration, power, cooling, rack space, increased performance and density—have changed the accepted assumptions of the previous SAN storage array market. Many vendors design and develop their own custom solid-state solutions. Consequently, more vendors are offering alternate solid-state media form factors with denser and faster systems when they create their own NAND flash storage packaging. From a whole system perspective, the largest SSAs now scale to 3.9PB, and next-generation SSD technology and interconnects will again redefine performance capabilities, creating demand for faster storage networks.

Neither the solid-state array, nor the storage array administrator is the bottleneck anymore; but network latency has become the challenge. This has extended the requirement and life span for 16 Gbps and 32 Gbps Fibre Channel SANs, as Ethernet-based networks and related storage protocols struggle to keep up. Many new vendors have entered the market who provide comprehensive service management, and along with many traditional storage vendors, they continue to transition their portfolios from HDD-based arrays to all solid-state arrays.

Therefore, an SSA that is two to three times more expensive to purchase becomes a cost-effective replacement for a hybrid or general-purpose array at increased utilization rates. With regard to performance, one SSD can typically replace multiple HDDs, combined with data reduction features and increased storage administrator productivity the price point at which SSA investment decisions are made is dropping rapidly. Redundant array of independent disks (RAID) rebuild times for high-capacity SSDs are also faster than for high-capacity HDDs. Therefore, as HDD storage capacities increase, so do HDD recovery times, and SSAs reduce the risk exposure during any media failure and recovery window. Use cases for SSAs are moving into analytics, file and object workloads, and some customers even use SSAs as backup targets to reduce backup and restore windows.

Price and ownership programs translate into very competitive purchase prices for buyers, but vendors are faced with challenges to becoming profitable as incumbent vendors discount to avoid losing market share and new vendors discount to attract new customers. Because the SSA market has expanded rapidly with SSD reliability being equal to or better than HDD arrays, and feature parity also equalizing, the competitive battle to differentiate has moved to ease of ownership, and remote and pre-emptive support capabilities.

In contrast to block and file I/O storage systems, when an object is stored in Object addressable data storage systems (OAS), the object is given a name that uniquely identifies it and that also specifies its storage location. This type of data access therefore may eliminate the need for a table index in a metadata store and it may not be necessary to track the location of data in the metadata. An OAS receives and processes access requests via an object identifier that identifies a data unit or other content unit rather than an address that specifies where the data unit is physically or logically stored in the storage system.

In OAS, a content unit may be identified using its object identifier and the object identifier may be independent of both the physical and logical locations where the content unit is stored. In other words, the object identifier does not control where the content unit is logically or physically stored. Thus, if a physical or logical location of a content unit changes, the identifier for access to the unit of content may remain the same. Thus, an application program may simply track the name and/or location of a file rather than tracking the block addresses of each of the blocks on disk that store the content.

Many storage systems have separate systems to de-duplicate and compress data and replication software is often added post system build. Server vendors have used available building blocks to slash server prices dramatically, yet storage incumbents continue to overcharge customers for their storage servers. Architectural complexity, non-integrated products, expensive proprietary networking protocols, cumbersome administration and licensing for every module of software are the norm and burden storage consumers with high prices and high maintenance.

Modern computing ecosystems rely on resilient data availability for most of their functions. This translates directly into failure-resilient storage systems, which have fostered the development of strategies in storage server solutions like clustering (multiple computers per file system), shared storage, and splitting of compute and file-system responsibilities. Simultaneously, the network file-system protocols like CIFS (Common Internet File System) and NFS (Network File System) have undergone modifications that allow applications running on remote clients to receive a seamless flow of data, irrespective of storage node failures at the server. This is primarily achieved by making the storage server cluster guarantee that once a client acquires a handle on a file by opening it, the cluster and not a specific node will honor client interactions for this file-handle. This guarantee has major implications to the manner in which client's file-handle data must be stored on a storage server.

In a traditional storage server, the storage host node, which services the client's request for opening a file, creates an in-memory context for the client's request to open the file and refers to it for all further client operations using the file-handle that it returns to the client as a part of an open response till the client relinquishes the file-handle, typically through a file-close.

This in-memory context, or client's file-handle info, can be grouped into the following categories. Mode of usage: The manner in which the client wishes to use the file, e.g. read, write, execute, delete etc. Mode of shared usage: The manner in which the client allows other clients to use this file concurrently. Locking information: The extent of the file over which the client wishes exclusive access. This state may also contain information about any soft-lock or opportunistic lock that the client holds for caching read and writes to the file locally. Any application specific context that the client wishes to save as opaque metadata for the lifetime of the file-handle.

For a failure-resilient storage system, this in-memory state, referred to as 'persistent-handle-info' or PHDL-info hereafter, must be made available to other nodes of the system, so that in the event of primary node failure, any other node in the storage cluster can serve the data to clients once the latter present their persistent-handles for reconnection. However, storing the persistent-handle-info for long time-intervals can cause considerable memory consumption on the storage server.

SUMMARY OF THE INVENTION

A method for managing file system memory includes starving an initial metadata memory area of a storage pool created for a file system transaction including cache data and log data. The method also includes determining on a transactional basis a ratio of metadata memory use to cache data use and an available unused portion of cache data memory replaceable in predetermined slab increments in the cache data. The method additionally includes shrinking transactionally the cache data per the slab increments based on the ratio via cleaning the cache data slabs and attaching the cache data slabs to the metadata memory area for temporary metadata use. The method further includes replacing the cache data slabs from the metadata memory area to the cache data based on a completion of the file system transaction. The slabs vary 5% to 10% or any arbitrary percentage ratio of metadata space to cache data space.

A non-transitory processor-readable storage medium is disclosed having one or more instructions which when executed by at least one processing circuit causes the at least one processing circuit to starve an initial metadata memory area of a storage pool created for a file system transaction among memory areas of a plurality of data types in the storage pool also including cache data and log data. The instructions also include a step to determine on a transactional basis a ratio of metadata memory use to cache data use and an available unused portion of cache data memory replaceable in predetermined slab increments in the cache data. The instructions further include a step to shrink transactionally the cache data per the slab increments based on the ratio via cleaning the cache data slabs and attaching the cache data slabs to the metadata memory area for temporary metadata use.

A system for managing file system memory includes a module configured to starve an initial metadata memory area of a storage pool created for a file system transaction among memory areas of a plurality of data types in the storage pool also including cache data and log data. The system also includes a module configured to determine on a transactional basis a ratio of metadata memory use to cache data use and an available unused portion of cache data memory replaceable in predetermined slab increments in the cache data. The system further includes a module configured to shrink transactionally the cache data per the slab increments based on the ratio via cleaning the cache data slabs and attaching the cache data slabs to the metadata memory area for temporary metadata use.

Other aspects and advantages of embodiments of the disclosure will become apparent from the following detailed description, taken in conjunction with the accompanying drawings, illustrated by way of example of the principles of the disclosure.

Figure 1:
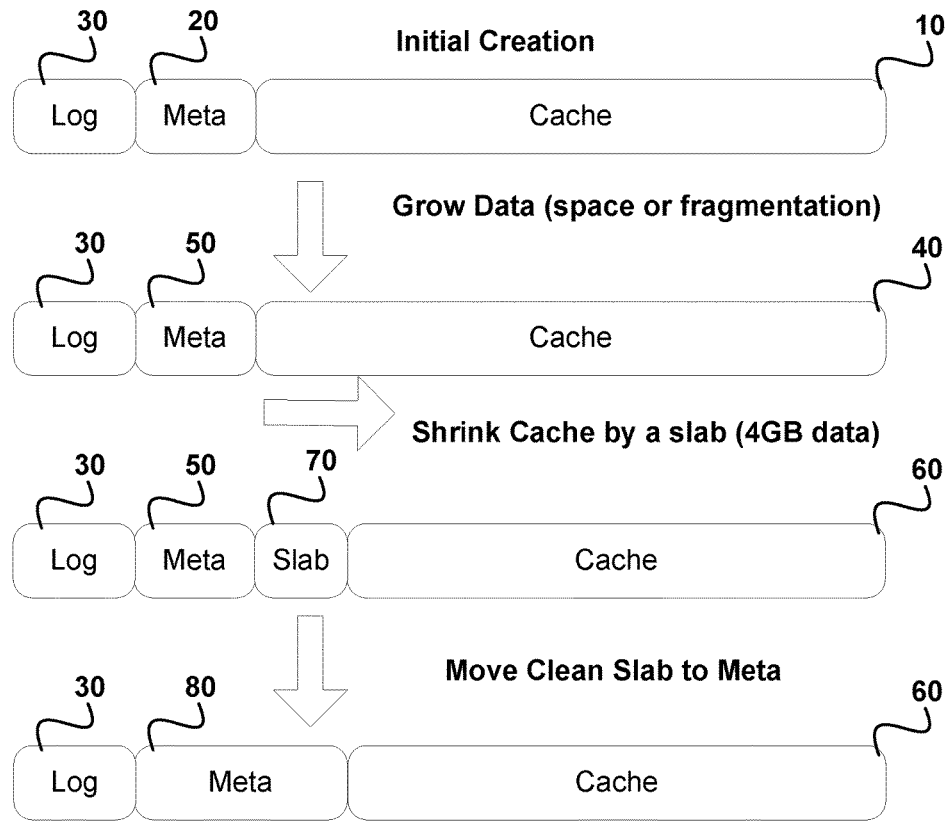
FIG. 1 is a block diagram of a computer program for a dynamic shrinker for metatdata area optimization in accordance with an embodiment of the present disclosure.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'shrink' and its gerund and derivatives including 'shrinking' refers to evicting a memory space from one data type for attaching to a memory space of another data type. The term 'transactional' and its derivatives including 'transactionally' refers to an interaction of a certain data application that adds, removes, or changes data in a file system or other computer program and is therefore a dynamic action. The term 'slab' refers to a logical or a physical contiguous partition of memory of a predetermined or an arbitrary size used to temporarily and dynamically attach memory space from one data type to another data type. In the present disclosure, the term, "starving" or the phrase "starving an initial metadata memory area," refers to an initial underallocation of memory expected for completion of an application or a system transaction.

Iflash® architecture provides a platform to share fast storage media resources very efficiently among different competing file system users. The storage media provides sharable resources, often with conflicting requirements for each. The disclosed infrastructure provides the mechanism (s) to detect the conflicting resource requirements and adjust resources dynamically among the competing users.

For example, capacity, IOPS (input output operations per second) and MBPS (mega bytes per second) are shared according to requirements from competing users. In the usual mode, MBPS capacity is statically shared between different type of applications. For example, a drive is logically or physically split in 3 static areas. One percent is assigned for log, 66% for metadata, and 33% for cache. This is a potential waste of the capacity of the fast storage media because metadata will not be 66% right from the start though it may be later. The space should be useable for cache data as it provides better read performance. When a pool starts, the metadata space consumed is very small and it grows over a long period of time. However, the capacity reserved for metadata is being initially wasted.

Similar underutilization is observed based on a policy to assign fixed percentage of the IOPS or MBPS according to application types. For example a static assignment may also be made of 10%, 65% and 25% to IOPS/MBPS for the log, meta, and cache respectively. However, depending on the use requirements over time, such assignment may be initially grossly unfair to one file system user in favor of another.

The disclosed infrastructure and mechanisms have the following 3 key parts. Creating the policy is one of the infrastructure three key parts. In one embodiment, the policy is to dynamically grow space for metadata starting from a starved smaller metadata space. Space is dynamically grown when fragmentation of the metadata increases to a certain level even if space consumed is not hit or at a bottleneck. Regarding IOPS or MBPS for instance, the creation policy can be to provide minimum IOPS or MBPS to certain data application type(s) in order to maximize IOPS and MBPS for other data application type(s).

Detecting the Policy Change is another one of the three infrastructure key parts. The disclosed infrastructure detects and tracks the required dataset/values such that the created Policy can be enforced as explained below. For example, the disclosed infrastructure detects and tracks how fragmented metadata is utilized. Similarly, the disclosed infrastructure detects and tracks the IOPS or MBPS consumed by application types, and tracks their respective oversubscription. Oversubscription is a slightly different concept in storage provisioning. In thin provisioning, a large amount of storage is set aside for an application, but storage is only released incrementally as additional capacity is needed. Since the application is given control of far more storage than it's actually able to use at the moment, that total storage capacity is said to be "oversubscribed" or "overbooked". This practice can tie up a considerable amount of storage long before it's ever really used, but it allows automatic allocation that can ease the management burden for storage administrators.

Dynamic Capacity change is an Action part of the three infrastructure key parts. Dynamic Capacity change occurs to enforce the detected policy creation changes as follows. When the Iflash® file system pool is created the reserved capacity for metadata is kept to a very small percentage. The cache data is allowed to take the rest of the capacity in the storage pool. When the metadata capacity exceeds a certain threshold (which is a function of not only capacity but also fragmentation), the cache data space is shrunk in small units, referred to as 'slabs' herein and dynamically attached to the metadata area. First, the cache region is cleaned in determined fixed units (for example, 4 GB) and then metadata is resized transactionally to include the new space as needed.

Software automatically detects and increases metadata area whenever needed. There are at least two ways this is accomplished. Metadata and cache data are statically configured or metadata area is changed at run time. The static configuration and the run time dynamic sizing are performed by an administrator. Therefore, the disclosed mechanism and scheme eliminates the need for an end-user or an administrator to find the correct size for the metadata and cache balance.

An embodiment of the disclosed infrastructure divides all whole regions into fixed size slabs of a predetermined size including a 4 GB slab. When the storage pool is created, it attaches a few slabs of 5% or 10% or any arbitrary number or percentage of space to the metadata and the rest of the space is allocated to the cache data.

In another embodiment, a mechanism is implemented which detects a) space filled for metadata and b) fragmentation for metadata by performance conditions and c) analysis of the cost savings for caching storage and metadata storage. Based on all three above, the mechanism figures out the size and number of slabs to be moved to or attached to the metadata area. Therefore, the mechanism will evict cached data by selecting a slab for replacement. Furthermore, the mechanism will transactionally move the slab to the metadata area and prepare it to be used in the metadata area. Once the transaction of interest completes, the slab is available for further data type use.

As described herein, file system information is maintained at a data class level, capacity, fragmentation level, weight assignment and IOPS and MBPS rate (moving average and burst by each data class).

FIG. 1 is a block diagram of a computer program for a dynamic shrinker for metatdata area optimization in accordance with an embodiment of the present disclosure. A non-transitory processor-readable storage medium is disclosed having one or more instructions which when executed by at least one processing circuit causes the at least one processing circuit to starve an initial metadata memory area 20 of a storage pool created for a file system transaction among memory areas of a plurality of data types in the storage pool also including cache data 10 and log data 30. As a data application program executes, data grows and fragments into available space per transactions which configure cache data 40 and metadata 50 from the original cache data 10 and the original metadata 20 in the storage pool. The instructions also include a step to determine on a transactional basis a ratio of metadata 50 memory use to cache data 50 use and an available unused portion of cache data 50 memory replaceable in predetermined slab 60 increments in the cache data. The instructions further include a step to shrink transactionally the cache data per the slab increments based on the ratio via cleaning the cache data slabs and attaching the cache data slabs to the metadata memory area for temporary metadata use.

Figure 2:
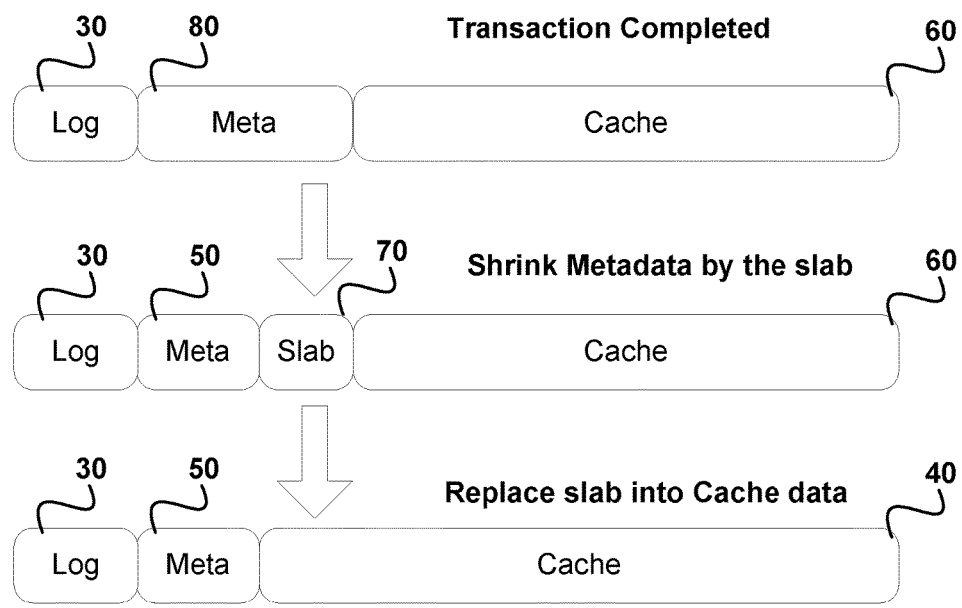
FIG. 2 is a block diagram of a computer program for a dynamic shrinker for cache data replacement in accordance with an embodiment of the present disclosure.

FIG. 2 is a block diagram of a computer program for a dynamic shrinker for cache data replacement in accordance with an embodiment of the present disclosure. Once an application transaction which necessitated the expanded metadata memory 80 from its starved initial state completes, a cache data slab 70 replacement occurs. The slab 70 evicted from the cache data is now evicted from the metadata 80. The cache data 40 is therefore expanded to state 40 and the metadata is shrunk to state 50 respectively.

Figure 3:
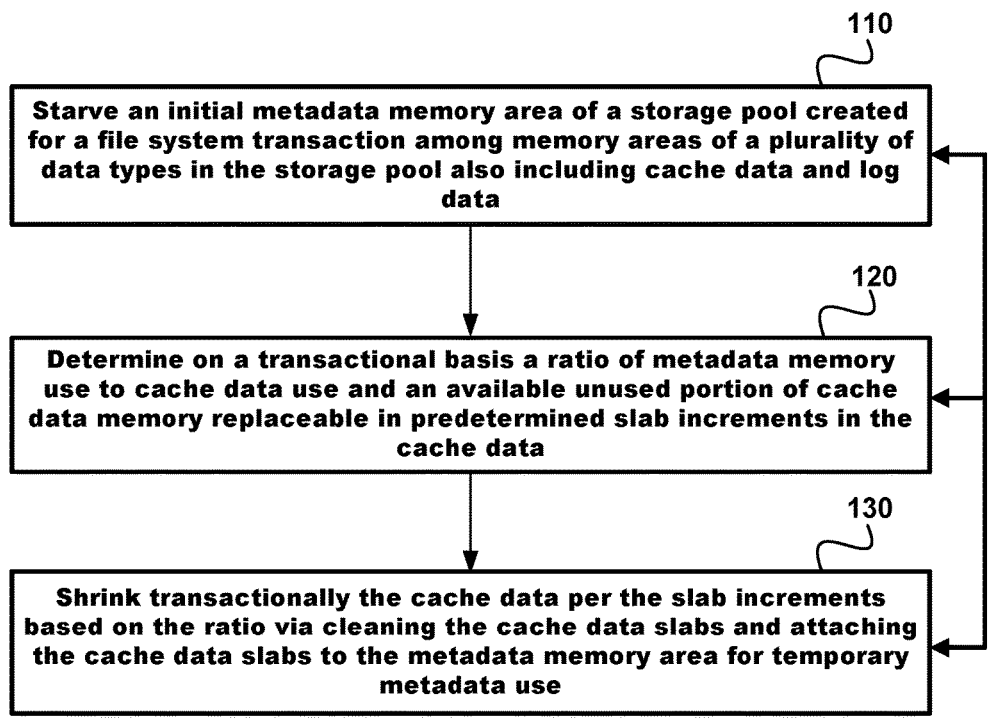
FIG. 3 is a flow chart of a method for dynamic shrinking for metatdata area optimization in accordance with an embodiment of the present disclosure.

FIG. 3 is a flow chart of a method for dynamic shrinking for metatdata area optimization in accordance with an embodiment of the present disclosure. The method includes starving 110 an initial metadata memory area of a storage pool created for a file system transaction including cache data and log data. The method also includes determining 120 on a transactional basis a ratio of metadata memory use to cache data use and an available unused portion of cache data memory replaceable in predetermined slab increments in the cache data. The method additionally includes shrinking 130 transactionally the cache data per the slab increments based on the ratio via cleaning the cache data slabs and attaching the cache data slabs to the metadata memory area for temporary metadata use.

Figure 4:
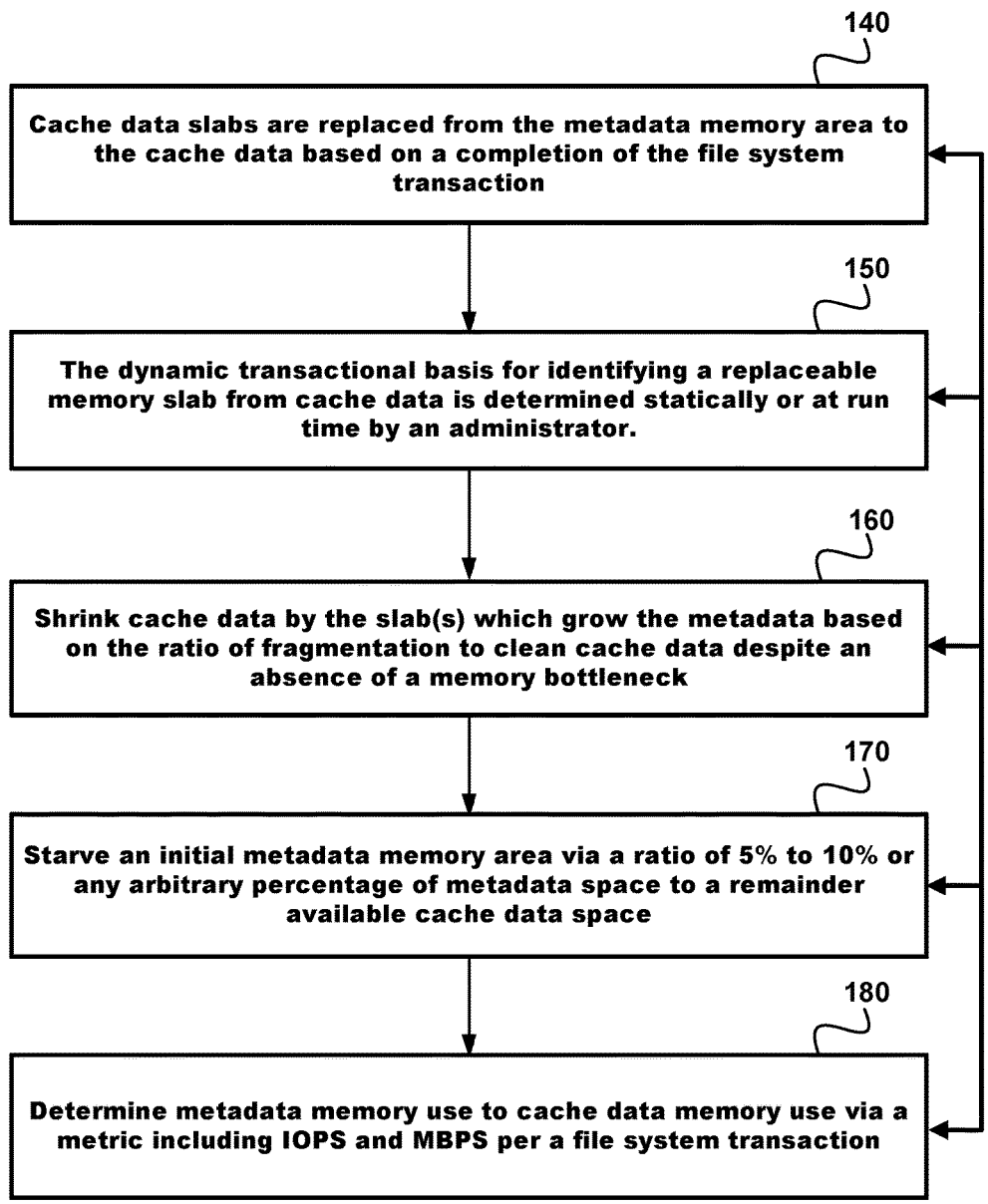
FIG. 4 is a flow chart of a method for cache data replacement on transaction completion from temporary metadata attachment in accordance with an embodiment of the present disclosure.

FIG. 4 is a flow chart of a method for cache data replacement on transaction completion from temporary metadata attachment in accordance with an embodiment of the present disclosure. The method depicted in FIG. 3 further includes replacing 140 the cache data slabs from the metadata memory area to the cache data memory area based on a completion of the file system transaction. The slabs vary 5% to 10% or any arbitrary percentage of metadata space to cache data space. The dynamic transactional basis for identifying 150 a replaceable memory slab from the cache data is determined statically or at run time by an administrator. Alternatively, the static determination or the run time determination is automated via software or a non-transitory processor-readable storage medium executed by at least one processing circuit. Cache data is shrunk 160 by the slab(s) which grow the metadata based on the ratio of fragmentation to clean cache data despite an absence of a memory bottleneck. Also disclosed is starving 170 an initial metadata memory area via a ratio of 5% to 10% or any arbitrary percentage of metadata space to a remainder available cache data space. In order to determine 180 a metadata memory use ratio to a cache data memory use a metric including IOPS and MBPS per a file system transaction is used.

Figure 5:
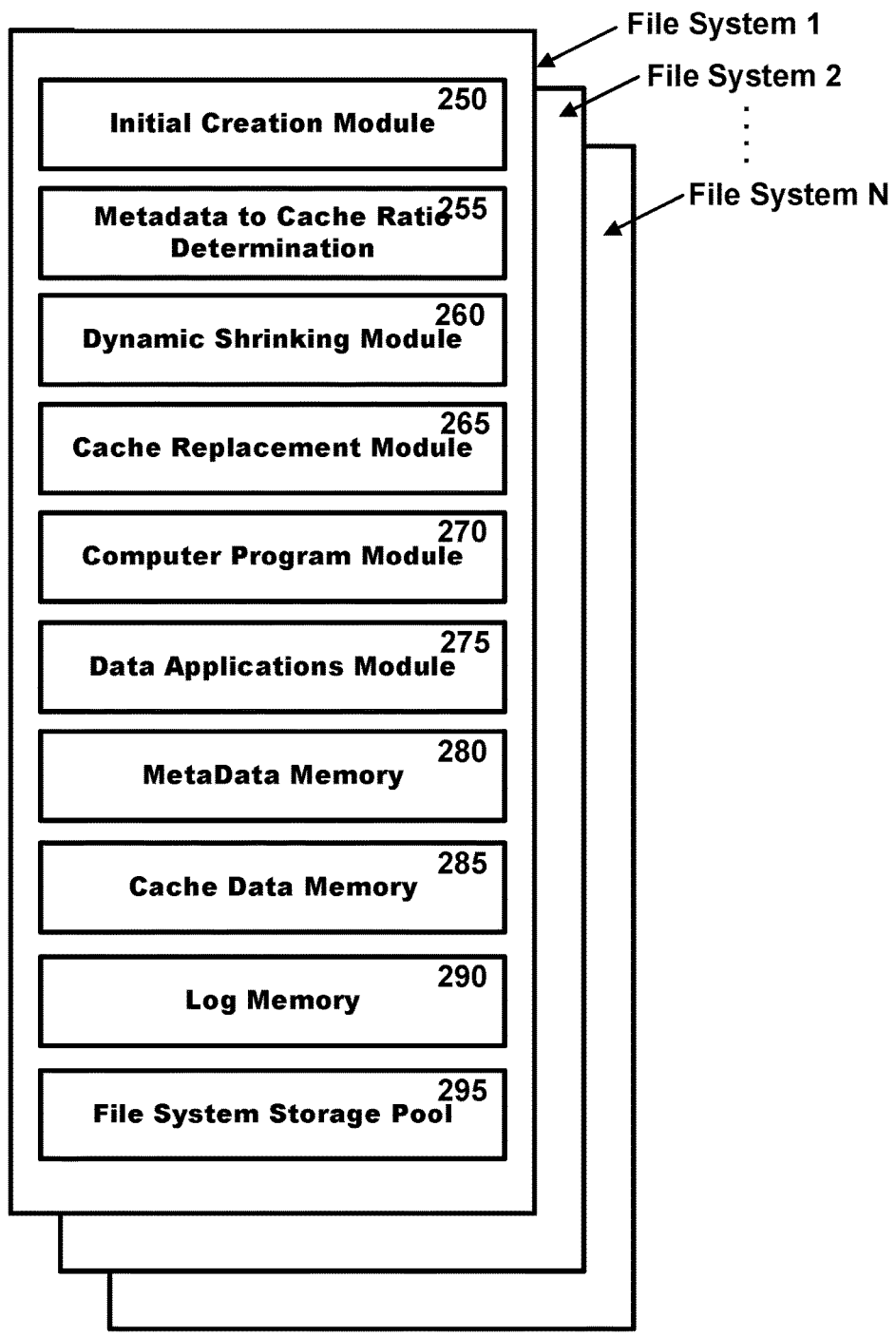
FIG. 5 is a block diagram of a system for a dynamic shrinker for metadata area optimization in accordance with an embodiment of the present disclosure.

FIG. 5 is a block diagram of a system for a dynamic shrinker for metadata area optimization in accordance with an embodiment of the present disclosure. The system includes an initial creation module 250, a metadata to cache ratio determination module 255, a dynamic shrinking module 260, a cache replacement module 265, a computer program module 270, a data applications module 275, a metadata memory module 280, a cache data memory module 285, a log memory 290 and a file system storage pool 295. Multiple file systems 1, 2 and up to an Nth file system reside contemporaneously in the system, each including the disclosed modules and components.

A system for managing file system memory includes a module configured to starve an initial metadata memory area of a storage pool created for a file system transaction among memory areas of a plurality of data types in the storage pool also including cache data and log data. The system also includes a module configured to determine on a transactional basis a ratio of metadata memory use to cache data use and an available unused portion of cache data memory replaceable in predetermined slab increments in the cache data. The system further includes a module configured to shrink transactionally the cache data per the slab increments based on the ratio via cleaning the cache data slabs and attaching the cache data slabs to the metadata memory area for temporary metadata use. The slab increments are a nominal 4Gigabytes in size An integrated log, cache and metadata intelligent flash architecture comprises four general-purpose arrays and three solid-state arrays, all of which are based on the same hardware and software architecture, and all of which support block and file protocols. The raw capacity of the largest array, the T3400, is relatively small at 314 TB. However, since the Tegile arrays are some of the few general-purpose disk arrays that have in-line compression and deduplication (depending on the data types), the usable capacity can often be several times larger and provide a very competitive price per usable capacity. The data reduction ratios also provide an environmental advantage in terms of power, cooling and physical rack space. The hardware is designed to be simple to maintain, and customers are allowed to add expansion shelves and extra disk capacity, and also to perform software upgrades and apply fixes themselves.

The same hardware, software architecture and technology are used across the entire disclosed storage array portfolio. Selective in-line data reduction and compression allow customers to select data reduction where required and, just as importantly, to disable it for unsuitable workloads. All software features are included in the base price of the storage array.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for managing file system memory comprising a storage pool comprising respective memory areas for metadata, cache data, and log data, the method comprising:
   a) starving an initial metadata memory area of a storage pool created for a file system transaction;
   b) determining on a transactional basis (a) a ratio of metadata memory use to cache data memory use based on input and output operations per second (IOPS) and/or megabytes per second (MBPS) per the file system transaction and (b) an available unused portion of cache data memory replaceable in predetermined slab increments from the cache data memory, wherein slab comprises a contiguous partition of memory; and
   c) shrinking transactionally the cache data memory per the slab increments based on the ratio of metadata memory use to cache data memory use via cleaning the cache data slabs and attaching the cache data slabs to the metadata memory area for metadata use, which grows the metadata memory area based on the ratio of fragmentation to clean cache data memory despite an absence of a memory bottleneck.

2. The method for managing file system memory of claim 1, further comprising replacing the cache data slabs from the metadata memory area to the cache data memory area based on a completion of the file system transaction.

3. The method for managing file system memory of claim 1, wherein the slab increments are nominal 4 Gigabytes in size.

4. The method for managing file system memory of claim 1, wherein the dynamic transactional basis is determined statically.

5. The method for managing file system memory of claim 1, wherein the dynamic transactional basis is determined at run time.

6. The method for managing file system memory of claim 1, further comprising dividing up the storage pool into memory slabs of am arbitrary memory size.

7. The method for managing file system memory of claim 1, wherein starving an initial metadata memory area comprises a ratio of 5% to 10% of metadata memory space to a remainder of available cache data memory space.

8. A system for managing file system memory comprising a storage pool comprising respective memory areas for metadata, cache data, and log data, the system comprising:
   a) at least one processing circuit;
   b) memory storing one or more modules executable by the at least one processing circuit;
   c) a module configured to starve an initial metadata memory area of a storage pool created for a file system transaction;
   d) a module configured to determine on a transactional basis a ratio of metadata memory use to cache data memory use based on input and output operations per second (TOPS) and/or megabytes per second (MBPS) per the file system transaction and an available unused portion of cache data memory replaceable in predetermined slab increments from the cache data memory, wherein a slab comprises a contiguous partition of memory; and e) a module configured to shrink transactionally the cache data memory per the slab increments based on the ratio of metadata memory use to cache data memory use via cleaning the cache data slabs and attaching the cache data slabs to the metadata memory area for temporary metadata use, which grows the metadata memory area based on the ratio of fragmentation to clean cache data memory despite an absence of a memory bottleneck.

9. The system for managing file system memory of claim 8, further comprising a module configured to replace the cache data slabs from the metadata memory area back to the cache data memory area based on a completion of the file system transaction.

10. The system for managing file system memory of claim 8, wherein the slab increments are a nominal 4 Gigabytes in size.

11. The system for managing file system memory of claim 8, wherein the dynamic transactional basis is determined statically.

12. The system for managing file system memory of claim 8, wherein the dynamic transactional basis is determined at run time.

13. The system for managing file system memory of claim 8, wherein starving an initial metadata memory area comprises a ratio of 5% to 10% of metadata memory space to a remainder of available cache data memory space.

14. A non-transitory processor-readable storage medium comprising one or more instructions which, when executed by at least one processing circuit, causes performance of:

a) starving an initial metadata memory area of a storage pool created for a file system transaction among respective memory areas in the storage pool for cache data and log data;

b) determining on a transactional basis (a) a ratio of metadata memory use to cache data memory use based on input and output operations per second (IOPS) and/or megabytes per second (MBPS) per the file system transaction and (b) an available unused portion of cache data memory replaceable in predetermined slab increments from the cache data memory, wherein a slab comprises a contiguous partition of memory; and c) shrinking transactionally the cache data memory per the slab increments based on the ratio of metadata memory use to cache data memory use via cleaning the cache data slabs and attaching the cache data slabs to the metadata memory area for temporary metadata use, which grows the metadata memory based on the ratio of fragmentation to clean cache data memory despite an absence of a memory bottleneck.

* * * * *